(12) United States Patent
Ferren

(10) Patent No.: US 9,088,882 B2
(45) Date of Patent: Jul. 21, 2015

(54) METHOD AND SYSTEM FOR COMMUNICATION BEHAVIOR

(75) Inventor: Bran Ferren, Beverly Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 853 days.

(21) Appl. No.: 12/646,389

(22) Filed: Dec. 23, 2009

(65) Prior Publication Data

US 2010/0317341 A1 Dec. 16, 2010

Related U.S. Application Data

(60) Provisional application No. 61/187,520, filed on Jun. 16, 2009.

(51) Int. Cl.
| | |
|---|---|
| H04M 1/57 | (2006.01) |
| H04W 4/16 | (2009.01) |
| H04M 1/663 | (2006.01) |
| H04M 1/725 | (2006.01) |
| H04M 19/04 | (2006.01) |

(52) U.S. Cl.
CPC ............... *H04W 4/16* (2013.01); *H04M 1/663* (2013.01); *H04M 1/72563* (2013.01); *H04M 19/04* (2013.01); *H04M 1/57* (2013.01)

(58) Field of Classification Search
CPC ....... H04M 19/04; H04M 1/57; H04M 1/663; H04M 1/72563; H04W 4/16
USPC .......................... 455/404.1, 419, 418, 456.1, 455/412.1–414.1; 379/142.02
See application file for complete search history.

(56) References Cited

U.S. PATENT DOCUMENTS

| | | | |
|---|---|---|---|
| 5,329,578 | A | 7/1994 | Brennan |
| 6,418,211 | B1 | 7/2002 | Irvin |
| 6,788,673 | B1 * | 9/2004 | Koskinen ...................... 370/352 |
| 7,020,271 | B2 | 3/2006 | Hummel |
| 2002/0107014 | A1 * | 8/2002 | Kosuri ........................... 455/426 |
| 2002/0128033 | A1 | 9/2002 | Burgess |
| 2003/0008644 | A1 | 1/2003 | Akhterzzaman et al. |
| 2003/0013495 | A1 * | 1/2003 | Oleksy ........................... 455/567 |
| 2004/0066932 | A1 | 4/2004 | Seligmann |
| 2004/0233892 | A1 | 11/2004 | Roberts et al. |

(Continued)

FOREIGN PATENT DOCUMENTS

| | | |
|---|---|---|
| CN | 1812442 | 8/2006 |
| CN | 101150625 | 3/2008 |

(Continued)

OTHER PUBLICATIONS

First Office Action Mailed Aug. 31, 2010, United Kingdom Patent Application No. 1009710.3, 11 pages.

(Continued)

*Primary Examiner* — Babar Sarwar
(74) *Attorney, Agent, or Firm* — Kacvinsky Daisak Bluni PLLC

(57) ABSTRACT

A method and system may include receiving an incoming call from a caller at a mobile device. The call information including one or more of a priority level and a group based on the call; may be received. A call handling rule to apply may be determined based on the call information. It may be determined whether to automatically override the call handling rule based on the call information and an implicit override parameter. Notification may be provided based on the override determination.

18 Claims, 5 Drawing Sheets

(56) References Cited

U.S. PATENT DOCUMENTS

| | | |
|---|---|---|
| 2004/0259536 A1 | 12/2004 | Keskar et al. |
| 2005/0025296 A1 | 2/2005 | Benco et al. |
| 2005/0141490 A1 | 6/2005 | Dolan |
| 2005/0192039 A1 | 9/2005 | Xue et al. |
| 2005/0197138 A1 | 9/2005 | Kaminsky et al. |
| 2005/0201362 A1* | 9/2005 | Klein et al. .................. 370/352 |
| 2005/0286701 A1* | 12/2005 | Suvanne et al. .......... 379/207.11 |
| 2006/0025159 A1 | 2/2006 | Estevez et al. |
| 2006/0094404 A1* | 5/2006 | Burgess ..................... 455/412.1 |
| 2007/0223662 A1 | 9/2007 | Jain et al. |
| 2007/0293246 A1* | 12/2007 | Pfleging et al. .............. 455/461 |
| 2008/0036591 A1 | 2/2008 | Ray |
| 2008/0089503 A1* | 4/2008 | Crockett et al. ......... 379/201.03 |
| 2009/0061932 A1 | 3/2009 | Nagarajan |
| 2010/0099398 A1* | 4/2010 | Bauchot et al. ............ 455/422.1 |

FOREIGN PATENT DOCUMENTS

| | | |
|---|---|---|
| EP | 1162853 | 12/2001 |
| EP | 1750422 A1 | 2/2007 |
| JP | 2001268638 | 9/2001 |
| JP | 2006020322 | 1/2006 |
| JP | 2006080575 | 3/2006 |
| JP | 2006333166 | 12/2006 |
| JP | 2008206017 | 9/2008 |
| WO | WO2006080575 | 3/2006 |
| WO | WO2007109342 | 9/2007 |
| WO | 2009063262 | 5/2009 |
| WO | 2009063262 A1 | 5/2009 |
| WO | WO 2009063262 A1 * | 5/2009 |

OTHER PUBLICATIONS

Office Action received for German Patent Application No. 102010019227.9-31, mailed Aug. 8, 2012, 4 pgs. including 2 pgs. English translation.

Office Action received for Japanese Patent Application No. 2010-135659, mailed Sep. 4, 2012, 4 pgs. including 2 pgs. English translation.

Office Action received for Chinese Patent Application No. 201010208648.X, mailed Nov. 7, 2012, 9 pages including 4 pages English translation.

* cited by examiner

METHOD AND SYSTEM FOR COMMUNICATION BEHAVIOR

PRIORITY INFORMATION

This application claims priority to the commonly-owned co-pending provisional patent application U.S. Ser. No. 61/187,520, entitled "Multi-Mode Handheld Electronic Device", filed Jun. 16, 2009.

BACKGROUND

A user of a mobile device may determine a setting on which to receive incoming calls. The user may set the mobile device to be silent, ring and/or vibrate. If the phone is set to ring, the incoming call may sound a particular ring tone previously determined by the user of the mobile device. The ring tone may be determined based on the information associated with the caller. Additionally, the user of the mobile device may set the mobile device to ring during certain hours of the day and may set the mobile device to vibrate during other hours of the day. While the user of the mobile device may choose from a variety of settings on the phone to customize use, the user lacks the ability to personalize and create overrides to the settings.

DETAILED DESCRIPTION

Various embodiments may be generally directed to a method and system for communication behavior. In one embodiment, for example, an incoming call from a caller at a mobile device may be received. Call information including a priority level and/or a group based on the call may be received. A call handling rule to apply may be determined based on the call information. It may be determined whether to automatically override the call handling rule based on the call information and an implicit override parameter. Notification may be provided based on the override determination.

Other embodiments may be described and claimed. Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
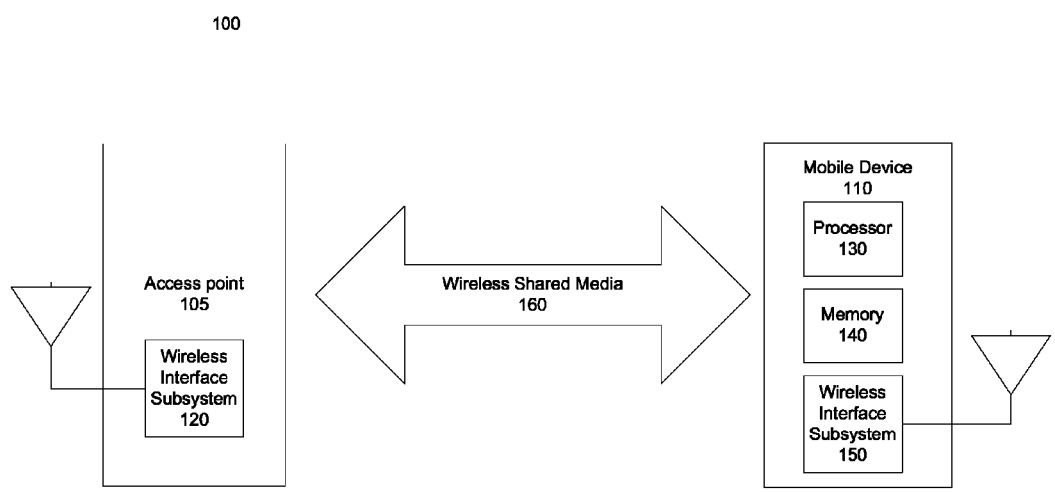
FIG. 1 illustrates one embodiment of a system for communication.

FIG. 1 illustrates one embodiment of a system. FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links, such as wireless shared media 140. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands. In the latter case, the wireless nodes may include one or more wireless interface subsystems and/or components for wireless communication, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 comprises multiple elements, such as an access point 105 and a mobile device 110 which communicate via wireless shared media 160. As shown by an access point 105, the access point may include a wireless interface subsystem 120. As shown by the mobile device 110, the mobile device 110 may include a processor 130, a memory unit 140, and a wireless interface subsystem 150. The embodiments, however, are not limited to the elements shown in FIG. 1.

In various embodiments, the communications system 100 may comprise or be implemented as a mobile broadband communications system. Examples of mobile broadband communications systems include, without limitation, systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In one embodiment, for example, the communications system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e Cor2/D3-2005) are Physical (PHY) layer specifications. WiMAX II is an advanced Fourth Generation (4G) system based on the IEEE 802.16m and IEEE 802.16j proposed standards for International Mobile Telecommunications (IMT) Advanced 4G series of standards. Although some embodiments may describe the communications system 100 as a WiMAX or WiMAX II system or standards by way of example and not limitation, it may be appreciated that the communications system 100 may be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1xRTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, 3rd Generation Partnership Project (3GPP) Rel. 8 and 9 of Long Term Evolution (LTE)/System Architecture Evolution (SAE) and so forth. The embodiments are not limited in this context.

In various embodiments, the communications system 100 may comprise an access point 105 having wireless capabilities. Although not explicitly illustrated in FIG. 1, access point 105 may include, for example, a structure that is similar to mobile device 110, including one or more of a processor, a memory, and software provided in memory to allow the access point 105 to perform a variety of functions.

In various embodiments, the communications system 100 may comprise a set of mobile devices 110 having wireless capabilities. The mobile devices 110 may comprise a generalized equipment set providing connectivity to other wireless devices, such as other mobile devices or an access point (e.g., access point 105). Examples for the mobile devices 110 may include, without limitation, a computer, server, workstation, notebook computer, handheld computer, telephone, cellular telephone, personal digital assistant (PDA), combination cellular telephone and PDA, and so forth. In one embodiment, for example, the mobile devices 110 may be implemented as mobile subscriber stations (MSS) for a WMAN. Although some embodiments may be described with the mobile devices 110 implemented as a MSS by way of example, it may be appreciated that other embodiments may be implemented using other wireless devices as well. The embodiments are not limited in this context.

As shown by the mobile device 110, the mobile device 110 may comprise a processor 130. The processor 130 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 135 may be implemented as a general purpose processor, such as a processor made by Intel® Corporation, Santa Clara, Calif. The processor 130 may be implemented as a dedicated processor, such as a controller, microcontroller, embedded processor, a digital signal processor (DSP), a network processor, a media processor, an input/output (I/O) processor, and so forth. The embodiments are not limited in this context.

As further shown by the mobile device 110, the mobile device 110 may comprise a memory unit 140. The memory 140 may comprise any machine-readable or computer-readable media capable of storing data, including both volatile and non-volatile memory. For example, the memory 140 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 140 may be included on the same integrated circuit as the processor 130, or alternatively some portion or all of the memory 140 may be disposed on an integrated circuit or other medium, for example a hard disk drive, that is external to the integrated circuit of the processor 130. In an embodiment, the memory may include data and instructions to operate the processor. The embodiments are not limited in this context.

In one embodiment, the mobile device may include a display. In one embodiment, the display may be an organic light emitting diode (OLED) display. In one embodiment, the display may be a liquid crystal display (LCD). In. In one embodiment, the display may be a touchscreen display.

In various embodiments, the mobile device 110 and the fixed device 105 may communicate information over wireless shared media 160 via respective wireless interface subsystems 120, 150. The wireless shared media 160 may comprise one or more allocations of RF spectrum. The allocations of RF spectrum may be contiguous or non-contiguous. In some embodiments, the wireless interface subsystems 120, 150 may communicate information over the wireless shared media 160 using various multicarrier techniques utilized by, for example, WiMAX or WiMAX II systems. In general operation, the wireless interface subsystem 120, 150 may communicate information using one or more communications channels. A communication channel may be a defined set of frequencies, time slots, codes, or combinations thereof.

In various embodiments, system 100 may include an access point 105 and a mobile device 110. The mobile device 110 may connect to the access point 105 over the wireless shared media 160. One or more logical or physical channels may be established to communicate information. The information may include media information and control information. Media information may refer to any data representing content meant for a user. Examples of content may include, for example, data from a voice conversation, videoconference, streaming video, electronic mail ("e-mail") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner.

Figure 2:
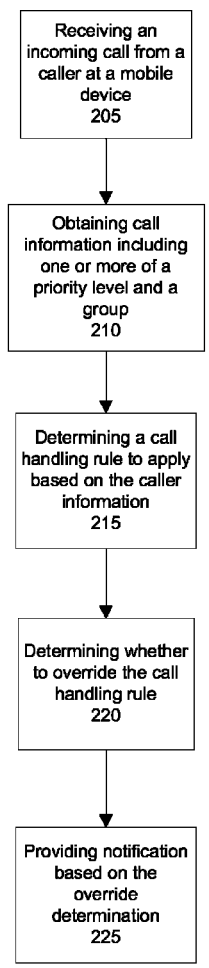
FIG. 2 illustrates one embodiment of a logic diagram.

FIG. 2 illustrates one embodiment of a logic flow. FIG. 2 illustrates a logic flow 200. Logic flow 200 may be representative of the operations executed by one or more embodiments described herein. As shown in logic flow 200, an incoming call may be received 205 from a caller at a mobile device. In one embodiment, the mobile device may be a wireless device. In one embodiment, a mobile device may receive 205 a call from a device including, but not limited to, another mobile device, a wireless device, a land line phone, a mobile computing device and/or a fixed computing device.

In one embodiment, call information may be obtained 210 based on the call. In one embodiment, the call information may include a priority level and/or a group. In one embodiment, the call information may include, but is not limited to, an identity of the caller and/or whether the caller is calling from a home phone number or a work number. In one embodiment, the identity of a caller may include, but is not limited to, a phone number, a last name, a first name and/or a customer number. In one embodiment, the call information may further include information about the relationship between the user of the mobile device and the caller. In one embodiment, the caller may be placed in groups based on the relationship. For example, the call information may include, but is not limited to, whether the caller is a friend, a relative and/or a business associate.

In one embodiment, call information may be received with the incoming call. In one embodiment, call information may be retrieved. In one embodiment, call information may be retrieved from storage in the user's mobile device. In one embodiment, call information may be stored in an information storage device accessible by the user's mobile device. An information storage device may include, but is not limited to, a database, chart, and/or a table. In one embodiment, call information may be stored on a remote device. In one embodiment, call information may include information found over a network connection. For example, call information may include one or more websites that contain a phone number, name or address matching the caller.

Figure 3:
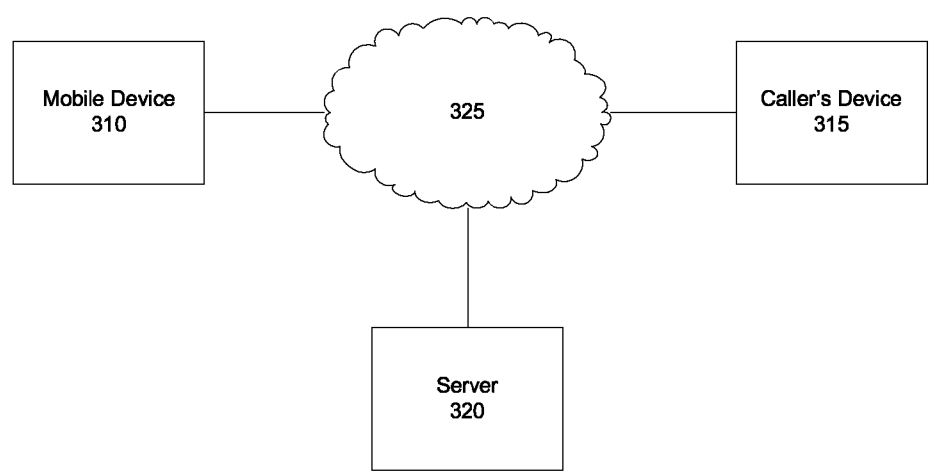
FIG. 3 illustrates one embodiment of system for determining external information.

FIG. 3 illustrates one embodiment of a system for determining external call information. FIG. 3 includes a user's mobile device 310. In one embodiment, the mobile device 310 may be the mobile device 110 in FIG. 1. The mobile device may communicate with a caller's device 315. In one embodiment, the caller's device may be another mobile device, a wireless device, a land line phone, a mobile computing device and/or a fixed computing device. In one embodiment, the user's mobile device 310 may communicate with a remote server 320. In one embodiment, the remote server 320 may include an information storage device. In one embodiment, the server 320 may include one or more databases, charts and tables. In one embodiment, the user's mobile device 310 may communicate with the service via a network connection 325. The network connection 325 may include the communications system 100 and/or the wireless shared media 160 discussed in regard to FIG. 1. The caller's device 315 may also communication with the user's device 310 via the network connection 325.

In one embodiment, the call information obtained 220 may include a priority level. In one embodiment, the priority level may be received with the incoming call. In one embodiment, the priority level may be retrieved. In one embodiment, the user of the mobile device may assign callers a priority level. In one embodiment, the priority level may be stored in an information storage device and automatically retrieved during the call. In one embodiment, the priority level may be associated with a number on a scale, such as, but not limited to, a number on a scale from 0 to 100, 0 to 10 or 1 to 5. In one embodiment, the priority level may be determined. For example, a call may have a priority level of zero or a low priority level if the message is not a priority. In one embodiment, the priority level of the call may be associated with a word. For example, a call may be determined to have a priority level of "Not Important", "Important", or "Urgent". In one embodiment, the priority level may be either "High" or "Low".

In one embodiment, the call information may include the mobile device's setting. For example, the call information may cause the user's mobile device to ring, remain silent, vibrate, or vibrate and ring upon receiving a call.

Referring back to FIG. 2, in one embodiment, a call handling rule to apply may be determined based on the call information 215. For a voice call, a call handling rule may be used to determine whether to alert a user and the type of alert, such as, but not limited to, sending a call to voicemail or causing the phone to ring and/or vibrate. For a text message or email, a call handling rule may be used to determine whether to alert and what type of alert, such as, but not limited to, causing the phone to vibrate or create a sound when a message is received.

In one embodiment, the user of the mobile device may set a call handling rule for the mobile device based on time of day. For example, the user may create a call handling rule that states that during weekdays between the hours of 8 am and 5 pm, the mobile device is on a vibrate setting and all other hours the mobile device is on a ring setting. In one embodiment, a call handling rule may be applied based on the relationship between the user of the mobile device and a caller. For example, a rule may state that between 8 am and 5 pm only calls which are from business associates may be set on ring. All other calls may be set on silent with only the caller's name displayed in a display of the mobile device. In applying this rule, the mobile device may determine if the caller belongs to the "business" group based on the call information.

In one embodiment, the call handling rule may be based on the priority level. For example, a call with a priority level of 5 may cause the mobile device to ring. If the ring goes unanswered, the call may be routed to voice mail. A call with a priority level of 4 may cause the caller to be offered the option of ringing the mobile device. In one embodiment, the caller may choose this option by a verbal response of "yes". In one embodiment, the caller may enter "1" to cause the mobile device to ring and may enter "2" to cause the mobile device to vibrate. If the caller chooses not to ring the mobile device, the mobile device may vibrate to announce the call. If the vibration goes unanswered, the call may be routed to voice mail. A call with a priority level of 3 may cause the mobile device to vibrate. If the vibration goes unanswered, the call may be routed to voice mail. A call with a priority level of 2 may cause the caller to be offered the option of vibrating the device. If the caller chooses not to vibrate the mobile device, the call may be routed to voice mail. A call with a priority level of 1 may cause the call to go directly to voice mail.

In one embodiment, a call handling rule to apply for incoming calls may be applicable when there are no calls in progress. In one embodiment, a call handling rule to apply for incoming calls may be applicable when there is a call in progress. For example, in one embodiment, the call handling rule may state that no calls can interrupt a call in progress when the call in progress is with a business caller.

In one embodiment, it may be determined 220 whether to automatically override the call handling rule based on an explicit override parameter. An explicit override parameter is based on one or more defined rules. In one embodiment, the call information may include a priority level. In one embodiment, the call information may include whether the priority level is "high". In one embodiment, there may be an explicit override parameter when the call handling rule if the priority level is "high". For example, if the call handling rule is that the mobile device vibrates when a call is received, this call handling rule may be overridden, using the explicit override parameter, when a caller has a priority level of "high". The explicit override parameter may allow the mobile device to ring when a "high" priority caller calls.

In one embodiment, it may be determined 220 whether to automatically override the call handling rule based on whether the priority level for the caller is higher than a priority threshold. If the priority level is higher than the priority threshold, then the call handling rule may be overridden using an explicit override parameter. For example, the call handling rule may be that received calls go directly to voicemail. However, this rule may be overridden by a caller with a priority level above the priority threshold. The caller, with the priority level above the priority threshold, can override the call handling rule and cause the mobile device to vibrate and/or ring.

In one embodiment, it may be determined 220 whether to automatically override the call handling rule based on an explicit override parameter determined by an override caller list. In one embodiment, call information may include an override caller list. In one embodiment, the override caller list may include one or more specific callers. For example, the user of the mobile device may cause the mobile device to implement a call handling rule based on a caller's group or priority level, but the user of the mobile device may create a list of callers who override the call handling rule. In one embodiment, the callers who are on the caller override list may be able to make the mobile device ring even though the call handling rule may state that all incoming calls are set to vibrate. In one embodiment, the callers who are on the caller override list may be able to have their calls vibrate even though the call handling rule may state that all incoming calls go directly to voicemail.

In one embodiment, the override caller list may be based on specific persons from a group of people. For example, the user of the mobile device's wife may override the call handling rule that the group "relatives" cause the mobile device to vibrate. In one embodiment, the caller override list may be based on a location of the caller and/or a time of the call. In one embodiment, the override caller list may allow a specific friend calling from work to cause the mobile device to ring rather than vibrate.

In one embodiment, the callers who are may be allowed to override a call handling rule may be given a higher priority level. For example, the group "business associates" may be given a priority level of 2, but a particular business associate may be given a priority level of 4. This may allow this particular business associate to have the option of causing the mobile device to ring rather than vibrate. In one embodiment, the callers who are allowed to override a call handling rule may be given a lower priority. For example, the group "friends" may be given a priority level of 3, but a particular friend may be specified and may be given a priority level of 1.

In one embodiment, it may be determined 220 whether to automatically override the call handling rule based on an explicit override parameter determined by an override code received from the caller. In one embodiment, a caller may have an override code which overrides the call handling rule.

In one embodiment, the override code may have been previously given to the caller from the user of the mobile device. In one embodiment, the override code may be a personal identification number (PIN) and/or a password. In one embodiment, the caller may have an override code that uses voice recognition technology, biometrics and/or keystrokes. determination In one embodiment, it may be determined 220 whether to automatically override the call handling rule based on the call information and an implicit override parameter. The prior examples discussed the call information and explicit override parameters. Explicit override parameters are based on one or more defined rules. Implicit override parameters, instead of being based on defined rules, are based on artificial intelligence, one or more heuristic algorithms, fuzzy logic and/or genetic algorithms. In one embodiment, the implicit override parameter may infer whether the call handling rule should be automatically overridden. In one embodiment, the implicit override parameter may use learned behavior by the mobile device to make a determination as to whether to override the call handling rule.

In one embodiment, it may be determined 220 whether to automatically override the call handling rule by generating an implicit override parameter from a call history of previous calls received by the mobile device from the caller. In one embodiment, it may be determined 220 whether to automatically override the call handling rule by generating the implicit override parameter based on a number of times a user of the mobile device answered a previous incoming call from the caller. In one embodiment, it may be determined 220 whether to automatically override the call handling rule by generating the implicit override parameter based on a number of times a user of the mobile device ignored a previous incoming call from the caller. For example, a caller may have a call priority level that is higher than the priority threshold. Based on the call having a priority level higher than the priority threshold, the mobile device may be allowed to ring rather than go directly to voicemail. However, prior to letting the call ring, the call history with the caller may be reviewed. It may be determined that the last six times that caller called, the user of the mobile device let the call go to voicemail. As a result, the implicit override parameter may determine that the call handling rule should not be overridden and that the call should go directly to voicemail. Therefore, even though the caller would override the call handling rule based on the call information, a call from this particular caller may implement the call handling rule.

Figure 4:
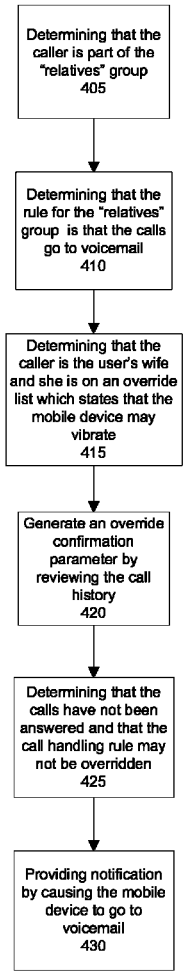
FIG. 4 illustrates one embodiment of a logic diagram for determining whether to override a call handling rule using a group association and prior call history.

In one embodiment, it may be determined whether to override the call handling rule 220 based on both the explicit override parameter and the implicit override parameter. FIG. 4 illustrates one embodiment of a logic diagram for determining whether to override a call handling rule using a group association and prior call history. Referring to the example in FIG. 4, after receiving a call, it may be determined 405 that the caller is part of the "relatives" group. The call handling rule may state 410 that caller from the group "relative" go to voicemail. However, the call information received may indicate 415 that the caller is the wife of the user and the explicit override parameter may determine that she is on a caller list which allows the mobile device to vibrate. The implicit override parameter may then determine 420 whether to allow the call to vibrate by reviewing the call history. If the user has not been receiving any calls that morning and has let calls from the override list go to voicemail 425, the implicit override parameter may not allow the override and will cause the call handling rule to be implemented. As a result, the wife's call may go to voicemail 430.

In one embodiment, the call handling rule may allow a caller with the priority level to decide if the mobile device should ring. The mobile device may use a voice prompt to allow the caller to cause the mobile device to ring. The caller may either verbally, or via the keypad, respond to the voice prompt and state that he/she would like the mobile device to ring. The implicit override parameter may then infer based on the call history and the user's response as to whether to allow the mobile device to ring. If the implicit override parameter determines that the mobile device should ring, the call handling rule may be overridden and the mobile device may ring.

Referring back to FIG. 2, in one embodiment, it may be determined 220 whether to automatically override the call handling rule based on the call information and an implicit override parameter. It may be determined whether to automatically override the call handling rule by generating an implicit override parameter from a call history of previous calls received by the mobile device from the caller and the user behavior in response to previous calls received by the mobile device from the caller. For example, the implicit override parameter may look at each time the user called a particular number and/or how quickly the user calls back a caller after receiving a call or voicemail from the caller. If each time the user received a voicemail from a certain caller, the user called the caller back within five minutes, then the implicit override parameter may confirm or approve of overriding the call handling rule which allows the mobile device to ring.

In one embodiment, it may be determined 220 whether to automatically override the call handling rule by based on the call information and an implicit override parameter by generating the implicit override parameter based on a location where the call is received. For example, the mobile device may determine that the mobile device is currently in an area where roaming charges would apply to any received call. As a result of the roaming location, the implicit override parameter may send all calls to voicemail. In one embodiment, the mobile device may determine that it is at home or in a loud location, therefore, the implicit override parameter may allow the mobile device to ring.

In one embodiment, it may be determined 220 whether to automatically override the call handling rule by generating an implicit override parameter based on how many rings it takes the user of the mobile device to answer a call from a caller. For example, a user of a mobile device may generally answer a call from a particular user within three rings. However, if over the past two days the user let the caller's calls go to voicemail, the implicit override parameter may not confirm an override and may send the call to voicemail.

In one embodiment, it may be determined 220 whether to automatically override the call handling rule by generating an implicit override parameter from information inferred from the call information stored on the mobile device. For example, a user may include information about a caller as part of the call information. However, information may be inferred from the call information. For example, the call handling rule may state that incoming calls in the evening should ring. However, the call information may be used to override the call handling rule for incoming calls from a coworker in the evening. The mobile device may use the call information to send those calls to voicemail. However, if the implicit override parameter infers that the caller is the user's new boss or if the implicit override parameter uses heuristics to determine that the user has previously picked up the majority of calls from this caller in the evening, then the implicit override parameter may allow the caller to ring the user's mobile device.

Figure 5:
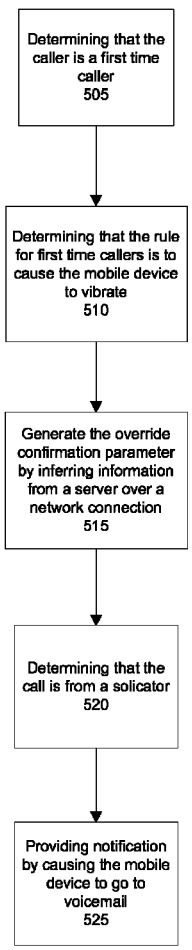
FIG. 5 illustrates one embodiment of a logic diagram for determining whether to override a call handling rule using inferences from information on a server.

In one embodiment, it may be determined 220 whether to automatically override the call handling rule based on the call information and an implicit override parameter. In one embodiment, it may be determined whether to automatically override the call handling rule by generating an implicit override parameter from information inferred from the call information stored on a remote device. FIG. 5 illustrates one embodiment of a logic diagram for determining whether to override a call handling rule using inference from a server. Referring to the example in FIG. 5, a call may be received and it may be determined 505 that the caller is a first time caller. According to the call handling rule, it may be determined 510 that first time callers cause the mobile device to vibrate. However, the implicit override parameter may be generated 515 by information inferred from a server over a network connection. Using the information on the internet, it may be determined 520 that the caller is a solicitation call. Accordingly, based on the call history and the implicit override parameter 525, the call to go directly to voicemail.

Referring back to FIG. 2, in one embodiment, based on the override determination, notification may be provided 225. In one embodiment, the mobile device may provide a ring based on the override determination. In one embodiment, a certain ring tone may be provided based on the override determination. In one embodiment, the mobile device may ring and vibrate based on the override determination. In one embodiment, the call may vibrate based on the override determination. In one embodiment, the call may be displayed on the display of the mobile device. In one embodiment, the call may go to voicemail based on the override determination and the notification may be in the form of a voicemail message. The embodiments, however, are not limited to these examples.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R.sctn. 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile device comprising:
a wireless interface subsystem; and
a processor and memory, the memory including data and instructions that when executed cause the processor to:
obtain call information received with an incoming call;
determine a call handling rule to apply to the incoming call based on the call information;
retrieve additional call information for the incoming call from a server over a network connection;
determine whether to automatically override the call handling rule based on an implicit override parameter generated using the retrieved additional call information, the retrieved additional call information including a name or address of a caller for the incoming call from which it is inferred that the incoming call is a solicitation call and the implicit override parameter causes the incoming call to go directly to voicemail; and
determine whether to automatically override the call handling rule also based on reception of an override codes including a voice recognition input override code and a biometric input override code.

2. The mobile device claim 1, wherein the call information received with the incoming call comprises at least one of a priority, a group, a relationship, an identity, and a phone number.

3. The mobile device of claim 1, determine whether to automatically override the call handling rule also based on an ambient noise level.

4. The mobile device of claim 3, the memory including data and instructions to operate the processor to cause the mobile device to ring when the ambient noise level is above a threshold.

5. The mobile device of claim 3, the memory including data and instructions to operate the processor to cause the mobile device to vibrate when the ambient noise level is below a threshold.

6. An article comprising a non-transitory computer-readable storage medium comprising instructions that when executed by a processor enable a system to:

obtain call information received with an incoming call;
determine a call handling rule to apply to the incoming call based on the call information;
retrieve additional call information for the incoming call from a server over a network connection, the additional call information including a name or address of a caller for the incoming call from which an inference is made as to whether the incoming call is a solicitation call;
determine whether to automatically override the call handling rule based on an implicit override parameter generated if the inference is made that the incoming call is a solicitation call, the implicit override parameter to cause the incoming call to go directly to voicemail; and
determine whether to automatically override the call handling rule also based on reception of override codes including a voice recognition input override code and a biometric input override code.

7. The article of claim 6, wherein the call information received with the incoming call comprises at least one of a priority, a group, a relationship, an identity, and a phone number.

8. The article of claim 6, comprising instructions that when executed by the processor enable the system to determine whether to automatically override the call handling rule also based on an ambient noise level.

9. The article of claim 8, comprising instructions that when executed by the processor enable the system to cause a mobile device to ring when the ambient noise level is above a threshold.

10. The article of claim 8, comprising instructions that when executed by the processor enable the system to cause a mobile device to vibrate when the ambient noise level is below a threshold.

11. A mobile device comprising:
a wireless interface subsystem; and
a processor and memory, the memory including data and instructions that when executed cause the processor to:
receive an indication of an incoming call;
determine a call handling rule to apply a type of alert for the incoming call based on at least one of a time of day and a day of a week of the incoming call;
retrieve call information for the incoming call from a server over a network connection, the call information including a name or address of a caller for the incoming call from which an inference is made as to whether the incoming call is a solicitation call;
determine whether to automatically override the call handling rule based on an implicit override parameter generated if the inference is made that the incoming call is a solicitation call, the implicit override parameter to cause the incoming call to CIO directly to voicemail; and
determine whether to automatically override the call handling rule also based on reception of an override codes including a voice recognition input override code and a biometric input override code.

12. The mobile device of claim 11, wherein the time of day is a range between particular hours of the day.

13. The mobile device of claim 11, wherein the call handling rule to set a vibrate setting for the type of alert based on the time of day or the day of the week of the incoming call.

14. The mobile device of claim 11, wherein the call handling rule to set a ring setting for the type of alert based on the time of day or the day of the week of the incoming call.

15. An article comprising a non-transitory computer-readable storage medium comprising instructions that when executed by a processor enable a system to:
receive an indication of an incoming call;
determine a call handling rule to apply a type of alert for the incoming call based on at least one of a time of day and a day of a week of the incoming call;
retrieve call information for the incoming call from a server over a network connection, the call information including a name or address of a caller for the incoming call from which an inference is made as to whether the incoming call is a solicitation call;
determine whether to automatically override the call handling rule based on an implicit override parameter generated if the inference is made that the incoming call is a solicitation call, the implicit override parameter to cause the incoming call to go directly to voicemail; and
determine whether to automatically override the call handling rule also based on reception of an override codes including a voice recognition input override code or and a biometric input override code.

16. The article of claim 15, wherein the time of day is a range between particular hours of the day.

17. The article of claim 15, wherein the call handling rule to set a vibrate setting for the type of alert based on the time of day or day of the week of the incoming call.

18. The article of claim 15, wherein the call handling rule to set a ring setting for the type of alert based on the time of day or day of the week of the incoming call.

* * * * *

UNITED STATES PATENT AND TRADEMARK OFFICE
CERTIFICATE OF CORRECTION

| | | |
|---|---|---|
| PATENT NO. | : 9,088,882 B2 | Page 1 of 1 |
| APPLICATION NO. | : 12/646389 | |
| DATED | : July 21, 2015 | |
| INVENTOR(S) | : Bran Ferren | |

It is certified that error appears in the above-identified patent and that said Letters Patent is hereby corrected as shown below:

Claims:

Column 12, claim 1, line 47, replace "of an override codes" with -- of override codes --.

Column 14, claim 11, line 5, replace "the incoming call to CIO directly to voicemail" with -- the incoming call to go directly to voicemail --.

Column 14, claim 11, line 7 and claim 15, line 35, replace "of an override codes" with -- of override codes --.

Column 14, claim 11, line 36, replace "including a voice recognition input override code or and" with -- including a voice recognition input override code and --.

Signed and Sealed this
Sixteenth Day of August, 2016

Michelle K. Lee
*Director of the United States Patent and Trademark Office*